(12) United States Patent
Kamisada et al.

(10) Patent No.: US 7,245,574 B2
(45) Date of Patent: Jul. 17, 2007

(54) OPTICAL HEAD AND ITS ADJUSTING METHOD AND OPTICAL DISK DEVICE USING THE SAME

(75) Inventors: Toshimasa Kamisada, Hiratuska (JP); Yasuo Kitada, Odawara (JP); Yoshiro Konishi, Hitachinaka (JP); Susumu Tachibana, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 640 days.

(21) Appl. No.: 10/313,197

(22) Filed: Dec. 6, 2002

(65) Prior Publication Data

US 2003/0161249 A1 Aug. 28, 2003

(30) Foreign Application Priority Data

Feb. 25, 2002 (JP) ............................. 2002-047295
Mar. 27, 2002 (JP) ............................. 2002-087389

(51) Int. Cl.
*G11B 7/125* (2006.01)
*G11B 7/135* (2006.01)

(52) U.S. Cl. ................................. 369/121; 369/112.23
(58) Field of Classification Search .................. 349/58; 353/100, 101; 359/641, 811, 819; 362/362, 362/632–634, 581; 369/112.23, 121, 44.12; 385/92

See application file for complete search history.

(56) References Cited

U.S. PATENT DOCUMENTS 5,285,462 A * 2/1994 Kasahara ...................... 372/36
5,394,430 A * 2/1995 Huang ......................... 372/107
5,442,616 A * 8/1995 Ogata et al. ............. 369/44.14
5,615,052 A * 3/1997 Doggett ...................... 359/811

(Continued)

FOREIGN PATENT DOCUMENTS

JP 02-042637 A 2/1990

(Continued)

OTHER PUBLICATIONS

PAJ Abstract of 2002-329332.*

(Continued)

*Primary Examiner*—Wayne Young
*Assistant Examiner*—Nathan Danielsen
(74) *Attorney, Agent, or Firm*—Townsend and Townsend and Crew LLP

(57) ABSTRACT

An optical disk apparatus includes a motor to rotate an optical disk and an optical head to apply light to the optical disk. The optical head includes a light source to emit the light to be applied to the optical disk, and a collimating lens to receive and collimate the light emitted by the light source. The collimating lens has an optical axis. The optical head also includes a support wall to support the collimating lens at a particular position. The support wall is configured to provide a gap between the collimating lens and the support wall to enable the collimating lens to be adjusted from an initial position to the particular position. The adjustment involves at least a movement in a direction that is perpendicular to the optical axis of the collimating lens. The optical head further includes an objective lens that is configured to receive the light from the collimating lens in order to apply the light to the optical disk.

4 Claims, 12 Drawing Sheets

U.S. PATENT DOCUMENTS

| | | | |
|---|---|---|---|
| 6,267,273 B1 * | 7/2001 | Suzuki et al. | 222/505 |
| 6,409,363 B1 * | 6/2002 | Wolff et al. | 362/362 |
| 6,664,998 B1 * | 12/2003 | Kyoya et al. | 369/112.05 |
| 6,958,969 B2 * | 10/2005 | Ogawa | 369/121 |
| 2002/0075916 A1 * | 6/2002 | Sato et al. | 372/36 |
| 2005/0169151 A1 * | 8/2005 | Fukakusa et al. | 369/44.12 |
| 2005/0271331 A1 * | 12/2005 | Machida et al. | 385/92 |
| 2006/0093284 A1 * | 5/2006 | Song | 385/92 |

FOREIGN PATENT DOCUMENTS

| | | | |
|---|---|---|---|
| JP | 07-153109 A | | 6/1995 |
| JP | 09063064 A | * | 3/1997 |
| JP | 09-219033 | | 8/1997 |
| JP | 2000-036117 A | | 2/2000 |
| JP | 2001-167464 A | | 6/2001 |
| JP | 2002329332 A | * | 11/2002 |

OTHER PUBLICATIONS

"Compact Disc Dokuhon," p. 203, 1988.

"Hikari Disk Storage no Kiso to Ouyou," p. 48, 1995.

* cited by examiner (a)

(b)

PRIOR ART

PRIOR ART

OPTICAL HEAD AND ITS ADJUSTING METHOD AND OPTICAL DISK DEVICE USING THE SAME

CROSS-REFERENCES TO RELATED APPLICATIONS

The present application is related to and claims priority from Japanese Patent Application No. 2002-047295, filed on Feb. 25, 2002, and Japanese Patent Application No. 2002-087389, filed on Mar. 27, 2002.

BACKGROUND OF THE INVENTION

The present invention relates to an optical disk apparatus including an optical head that focus laser light onto an optical disk to record information on the optical disk or reproduce information recorded on the disk.

FIG. 4 shows a semiconductor laser assembled within a package according to a conventional technology as a laser light source. The laser chip 2 of a semiconductor laser 1 is packaged on a base 3 and is sealed by a cap 4 with a glass window. The direction of emission (intensity distribution center) 6 of laser light 5 emitted from the laser chip 2 varies about 3 degrees with respect to the vertical line of the base 3, and the position of the light emission point 26 of the laser chip 2 varies about 80 μm with respect to the center line 35 of the base 3. Further, a light intensity distribution 7 in a plane perpendicular to the direction of emission (center of intensity distribution) 6 of the laser light 5 is symmetric with respect to the direction of emission (center of intensity distribution) 6. The configuration of the package of the semiconductor laser like this is disclosed in, for example, "The Basics and Application of Optical Disk Storage," published by Electronic Information Communications Institute in 1995, page 48.

FIG. 6 is an example of the configuration of an optical head in the prior art. In a case or housing 8 are arranged a semiconductor laser 1, a beam splitter 9, a collimating lens 10, a cylindrical lens 11, a photodetector 12, and an objective lens 13. The objective lens is supported by the case 8 and configured to be moved by a spring 14.

Laser light 5 emitted from the semiconductor laser 1 passes through the beam splitter 9 and is collimated by the collimating lens 10 and is focused on an optical disk 21 by the objective lens 13.

The optical disk 21 reflects the laser light 5 to the beam splitter 9. The beam splitter 9, in turn, reflects the light 5 to the photodetector 12 via the cylindrical lens 11. A system circuit (not shown) controls the position of the objective lens 13 with respect to the optical disk 21 by the output of the photodetector 12 and reproduces the signal of the optical disk 21.

An optical head having this kind of configuration is disclosed in, for example, "Illustrated Compact Disk Reader (second revised edition)" published by Ohm Co., Ltd., in 1988, page 203. In the configuration shown in FIG. 6, if the direction of emission (center of intensity distribution) 6 of the semiconductor laser 1 is deviated with respect to an optical axis 15 of the objective lens 13 and the collimating lens 10, then the intensity distribution of the laser light 5 reaching the photodetector 12 is deviated, which in turn may cause an offset in the output signal of the photodetector 12, in particular, a track error signal and a focus error signal that utilize a change in the intensity distribution of light in the photodetector 12. For this reason, there is adopted a structure for adjusting the semiconductor laser 1 in such a way that the direction of emission (center of intensity distribution) 6 is aligned to the optical axis 15.

The case 8 is provided with a mounting surface 16 perpendicular to the optical axis 15 of the objective lens 13 and the collimating lens 10. The semiconductor laser 1 is secured to a holder 17 and is secured to the mounting surface 16 in the state in which the direction of emission (center of intensity distribution) 6 is adjusted to be perpendicular to the mounting surface 16 by the use of the holder 17 and a holder base 18. The holder 17 and the holder base 18 are provided with a spherical seat 19 having its center at the laser chip 2, and the holder 17 is bonded and fixed to the holder base 18 in the state in which the direction of emission (center of intensity distribution) 6 is adjusted to be perpendicular to the mounting surface 16 via the spherical seat 19. Further, the holder base 18 gets its position adjusted in the mounting surface 16 in such a way that a laser light emission point 26 is aligned with the optical axis 15 and is secured using screws 20. The configuration described above makes a structure complex and thus difficult to obtain high accuracy even if the holder base 18 and the case 8 are provided with fitting portions. Therefore, it is difficult to make the laser emission point 26 be aligned with the optical axis 15, so it is necessary to make a position adjustment. This kind of configuration of the semiconductor laser and the holder is disclosed in, for example, Japanese Patent Unexamined Publication No. 9-219033.

An exemplary assembling process for the above prior art will be described with reference to FIG. 7. First, the semiconductor laser 1 is pressed into the holder 17 and is fixed there (step 201). The holder is a single, unitary structure according to one embodiment of the present invention. Next, the holder base 18 is fixed to a jig (not shown) and the holder 17 gets its angle adjusted in such a way that the direction of emission of laser light 5 is perpendicular to the mounting surface of the holder base 18, and then the holder 17 is fixed to the holder base 18 (step 202).

Referring now to the main part of the optical head, first, the beam splitter 9 and the cylindrical lens 11 are bonded and fixed to the case 8 (step 211). The case 8 has positioning references for these components and these components are bonded and fixed to the case 8 in accordance with these references. Next, the holder base 18 adjusted in the step 202 is temporarily fixed to the mounting surface 16 of the case 8 (step 212).

Next, the terminal of the semiconductor laser 1 is inserted into the hole of an FPC (Flexible Printed Circuit) (not shown) and is soldered thereto. In a part of the FPC, a drive LSI for driving the semiconductor laser 1 is soldered to a wiring pattern in the previous step, and the drive LSI is connected to a superordinate circuit via a connector. The drive LSI described above makes the semiconductor laser 1 emit light according to a signal from the superordinate circuit. The output terminal of the drive LSI is connected to the terminal of semiconductor laser 1 by a pattern wiring formed on the FPC described above. Further, in the previous step, the photodetector 12 is soldered to the FPC described above (step 213). The output of the photodetector 12 is connected to the superordinate circuit via the connector described above and the laser light described above is used for controlling a position on the optical disk 21 with high accuracy and reproducing information recorded on the optical disk 21.

Next, the collimating lens 10 is mounted on the case 8. The case 8 is provided with a mounting reference surface so as to make the collimating lens 10 move along the optical axis. The semiconductor laser 1 is made to emit light and the position of the collimating lens 10 is adjusted along the optical axial direction to collimate the laser light 5 passing through the collimating lens 10. After an adjustment has been made, the collimating lens 10 is bonded and fixed there (step 214). For example, FIG. 11 shows a cross-sectional view of the collimating lens 10 bounded and secured to the case 8 using a UV-curing adhesive 37. The collimating lens 10 is mounted on a mounting reference surface 47 that is obliquely provided on the case 8.

The parallelism of the laser light 5 emitted from the collimating lens 10 is achieved by detecting the size of an image made when a CCD camera disposed at a sufficient distance away receives the laser light emitted from the collimating lens 10 and by adjusting the position of the collimating lens 10 to make the size of the image not larger than a predetermined size. Next, the position of the holder base 18 is adjusted on the mounting surface 16 to make the laser light emitted from the collimating lens 10 be aligned with the optical axis of the collimating lens 10 and then the holder base 18 is fixed to the mounting surface 16 by the screws 20 (step 215).

Next, an objective lens actuator (not shown) is mounted on the case 8 (step 216). At this time, the objective lens actuator is mounted at a given position on the case 8 by a fitting portion or the like in such a way that the optical axis of the objective lens 13 is aligned with the optical axis of the collimating lens 10. Then, the optical head is mounted on a servo signal adjusting jig to detect the output of the photodetector 12 caused by the laser light 5 which is emitted by the semiconductor laser 1, reflected by the optical disk 21 mounted on the jig described above, and entered into the photodetector 12. The position of the photodetector 12 is adjusted in such a way that a focus signal and a tack error signal, which are produced by the output of the photodetector 12 described above, satisfy predetermined characteristics, and the photodetector 12 is bonded and fixed there (step 217). The above-mentioned steps constitute the assembling process of the optical head according to a conventional technology.

BRIEF SUMMARY OF THE INVENTION

As described above, the conventional method uses two holders each of which has a spherical seat to reduce variations in the direction of emission (center of intensity distribution) of the laser light source, so that the outside shape of the holder becomes large and its structure becomes complex. Therefore, it is difficult to reduce the size of the optical head and to manufacture the holder at low cost.

One embodiment of the present invention provides a small-sized and inexpensive optical head that can reduce variations in the direction of emission (center of intensity distribution) of a laser light source and ensure its positioning accuracy with respect to the optical axis of an objective lens using a simple structure.

For example, an optical head includes a laser light source, a collimating lens that nearly collimates laser light emitted from the laser light source, an objective lens that collects the laser light passing through the collimating lens to be focused on an optical disk, and a case that holds these, by adjusting the laser light source in such a way that the direction of emission (center of intensity distribution) of the laser light source passes the point of intersection of the optical axis of the objective lens described above and the principal plane on the laser light source side of the collimating lens described above.

Another embodiment provides a simple assembling procedure suitable for the feature of the optical head described above.

For example, an optical head includes a laser light source; a holder that holds the laser light source; a collimating lens that nearly collimates laser light emitted from the laser light source; an objective lens that collects the laser light passing through the collimating lens on an optical disk; and a case that holds these, wherein the holder is positioned to the case by a fitting portion, by adjusting the laser light source described above with respect to the holder in such a way that the direction of emission (center of intensity distribution) of the laser light of the laser light source agrees with the point of intersection of the optical axis of the objective lens described above and the principal plane on the laser light source side of the collimating lens described above.

In one embodiment, an optical disk apparatus includes a motor to rotate an optical disk; and an optical head to apply light to the optical disk. The optical head includes a light source to emit the light to be applied to the optical disk, and a collimating lens to receive and collimate the light emitted by the light source. The collimating lens has an optical axis. The optical head also includes a support wall to support the collimating lens at a particular position. The support wall is configured to provide a gap between the collimating lens and the support wall to enable the collimating lens to be adjusted from an initial position to the particular position. The adjustment involves at least a movement in a direction that is perpendicular to the optical axis of the collimating lens. The optical head further includes an objective lens that is configured to receive the light from the collimating lens in order to apply the light to the optical disk.

In another embodiment, an optical head includes a laser light source to emit light to be applied to the optical disk, a holder having a unitary structure to hold securely the laser light source at a given position, a collimating lens to receive and collimate the light emitted by the light source, the collimating lens having an optical axis, and a support wall to support the collimating lens at a particular position. The support wall is configured to provide a gap between the collimating lens and enable the collimating lens to be adjusted from an initial position to the particular position, the support wall and the collimating lens being separated from each other at all points by at least a given distance. The optical head also includes an objective lens that is configured to receive the light from the collimating lens and apply the light to the optical disk.

In another embodiment, an optical head includes a light source assembly including: semiconductor laser configured to emit light to be applied to the optical disk, and a holder having a unitary structure to hold the laser light source at a fixed position, the holder having a convex inner portion to receive and securely hold the semiconductor laser. The optical head also includes a collimating lens to receive and collimate the light emitted by the light source, the collimating lens having an optical axis; a support assembly to support the collimating lens at a particular position, the support assembly being configured to provide a gap between an edge of the collimating lens and an edge of the support assembly, so that the collimating lens may be adjusted from an initial position to the particular position; an adhesive provided in at least a portion of the gap between the support assembly and the collimating lens, the adhesive being hardened to securely hold the collimating lens at the particular position; and an objective lens being configured to receive the light from the collimating lens and apply the light to the optical disk. The light source assembly is configured to emit the light in a direction that is not parallel to an optical axis of the objective lens.

In another embodiment, a method for making an optical head includes providing a collimating lens at a first position relative to a support wall configured to support the collimating lens. The collimating lens and the support wall defines a gap therebetween. The collimating lens and the support wall are not contacting each other at any point. Thereafter, the collimating lens is provided at a second position relative to the support wall by moving the collimating lens or the support wall at least along a direction that is perpendicular to an optical axis of the collimating lens.

In yet another embodiment, a method for manufacturing an optical head includes inserting a laser light source into a unitary-structured holder configured to hold the laser light source. The laser light source is configured to emit light. A position of the laser light source is adjusted with respect to the holder, so that the center of a direction of emission of the light of the laser light source passes through a point of intersection of an optical axis of the objective lens and a principal plane of the collimating lens. A collimating lens is provided at a first position relative to a support wall configured to support the collimating lens. The collimating lens and the support wall define a gap therebetween, so that surfaces of the collimating lens that are parallel to an optical axis of the collimating lens are not contacting the support wall. The collimating lens is provided at a second position relative to the support wall by moving the collimating lens at least along a direction that is perpendicular to the optical axis of the collimating lens.

DETAILED DESCRIPTION OF THE INVENTION

One embodiment of the present invention will be described in detail by the use of FIG. 1 to FIG. 5. In the following description, the components having substantially the same functions as those in FIG. 6 are denoted with the same reference numbers for illustrative convenience. However, this should not be used to limit the scope of the present invention.

Figure 1:
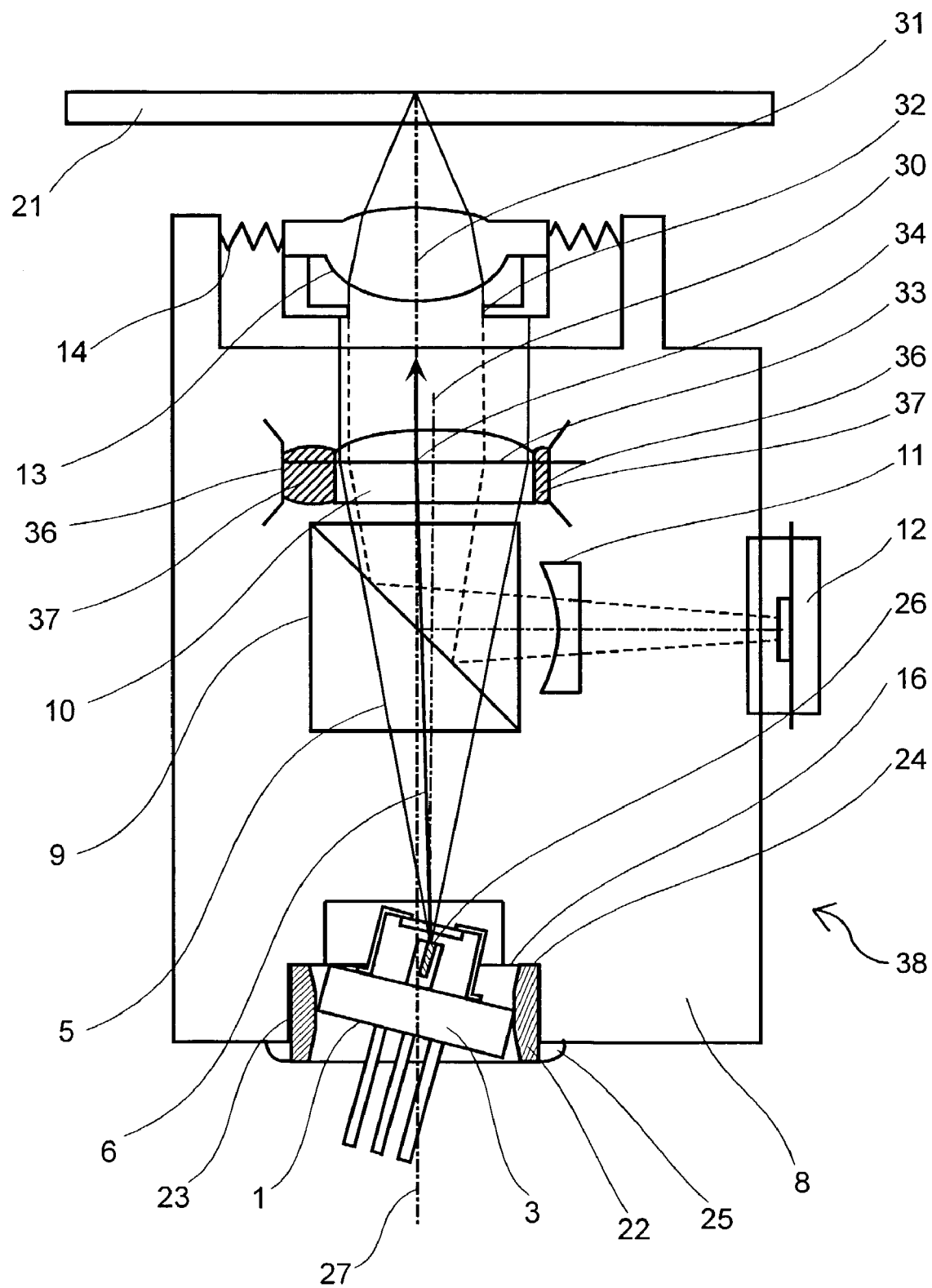
FIG. 1 is a schematic view of the optical head of according to one embodiment of the present invention.

FIG. 1 shows the configuration of an optical head according to one embodiment of the present invention. An optical head 38 includes a case 8, a laser light source 1 (e.g., a semiconductor laser), a holder 22 configured to securely grip the semiconductor laser 1, a beam splitter 9, a collimating lens 10, an objective lens 13, an actuator (not shown) for driving the objective lens, a cylindrical lens 11, and a photodetector 12. The actuator that holds and drives the objective lens 13 has a circular aperture 32 and laser light enters the objective lens 13 through the aperture 32. An optical disk 21 is disposed opposite to the objective lens 13.

Generally, the optical axis of the objective lens 13 is designed to be perpendicular to the surface of the optical disk 21. An optical head for recording is configured so that the collimating lens 10 causes the laser light emitted from the semiconductor laser 1 to travels in a path that is parallel to the optical axis of the objective lens 13. In addition, the optical head is adjusted in such a way that the center of intensity distribution of the laser light entering the objective lens 13 is aligned with the optical axis of the objective lens 13.

To satisfy the optical conditions described above, the optical head 38 of the present invention is adjusted, so that the direction of emission (center of intensity distribution) 6 of the semiconductor laser 1 passes the point of intersection 34 of the optical axis of the objective lens 13 described above and the principal surface on the semiconductor laser side of the collimating lens 10 described above, and hence the direction of emission (center of intensity distribution) 6 of the semiconductor laser 1 is not necessarily parallel to the optical axis of the objective lens 13. The optical head 38 is adjusted to bring the laser light 5 passing through the objective lens 13 into focus on the axis of the objective lens 13. It is well known that the wave aberration of the laser light 5 passing through the objective lens 13 becomes minimum at this instance.

Figure 2:
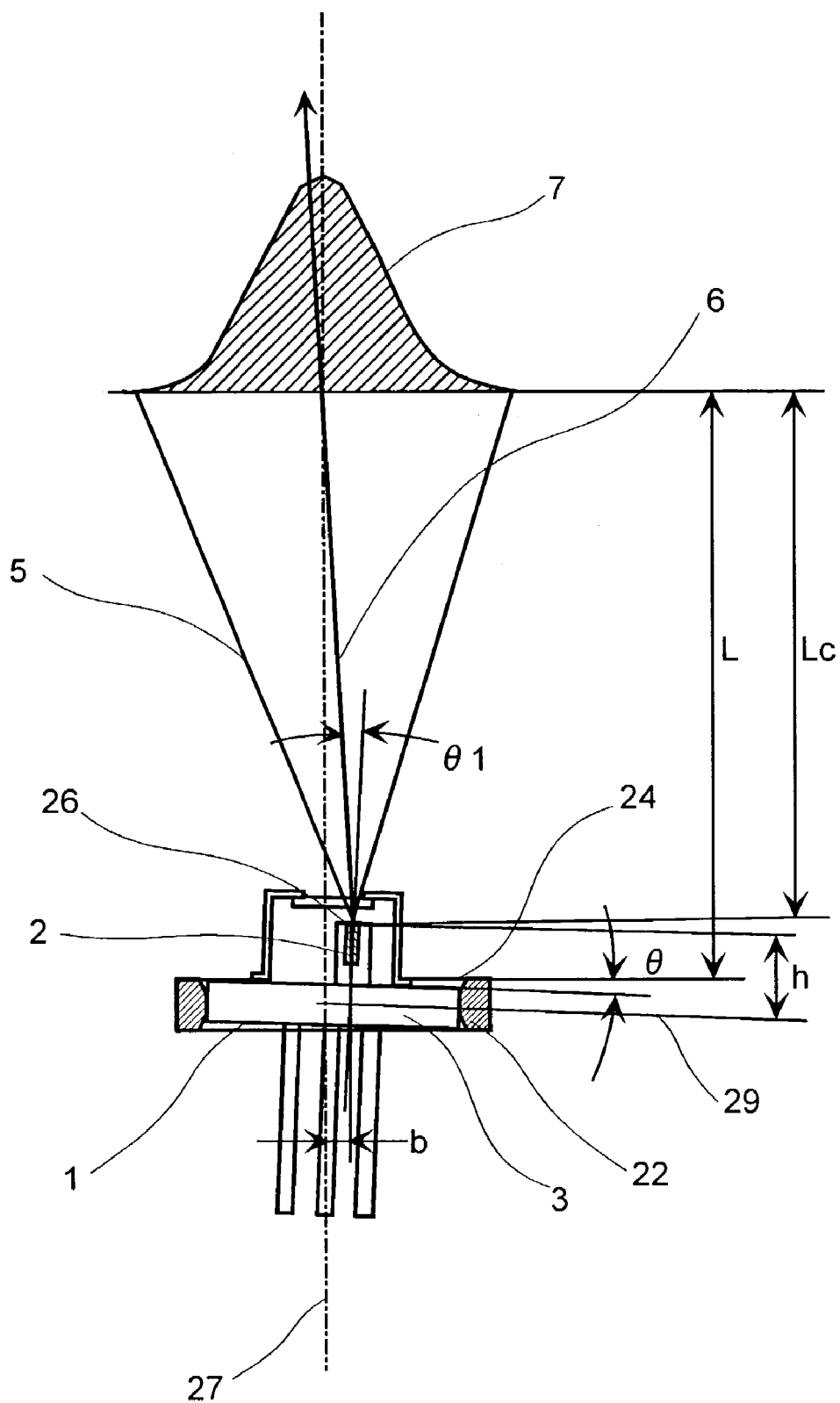
FIG. 2 is a cross-sectional view of the semiconductor laser and the holder of the optical head in FIG. 1.
Figure 3:
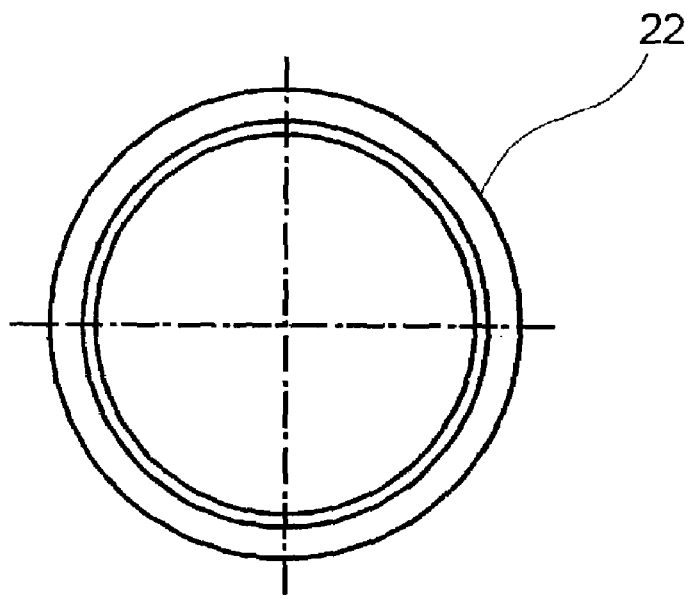
FIG. 3 is a plan view and a cross-sectional view to show the shape of the holder of FIG. 2.
Figure 3:
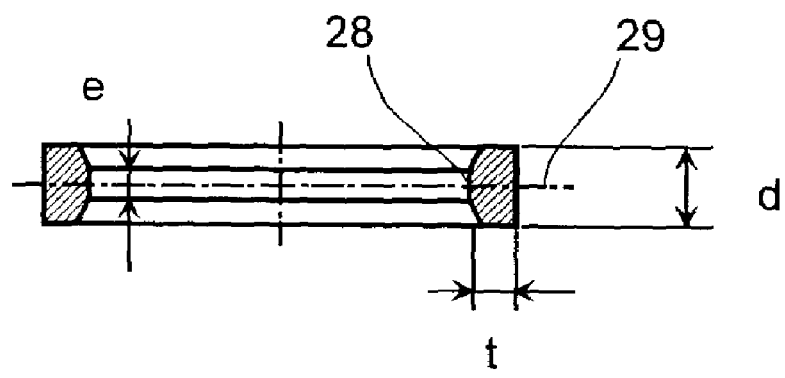
Figure 4:
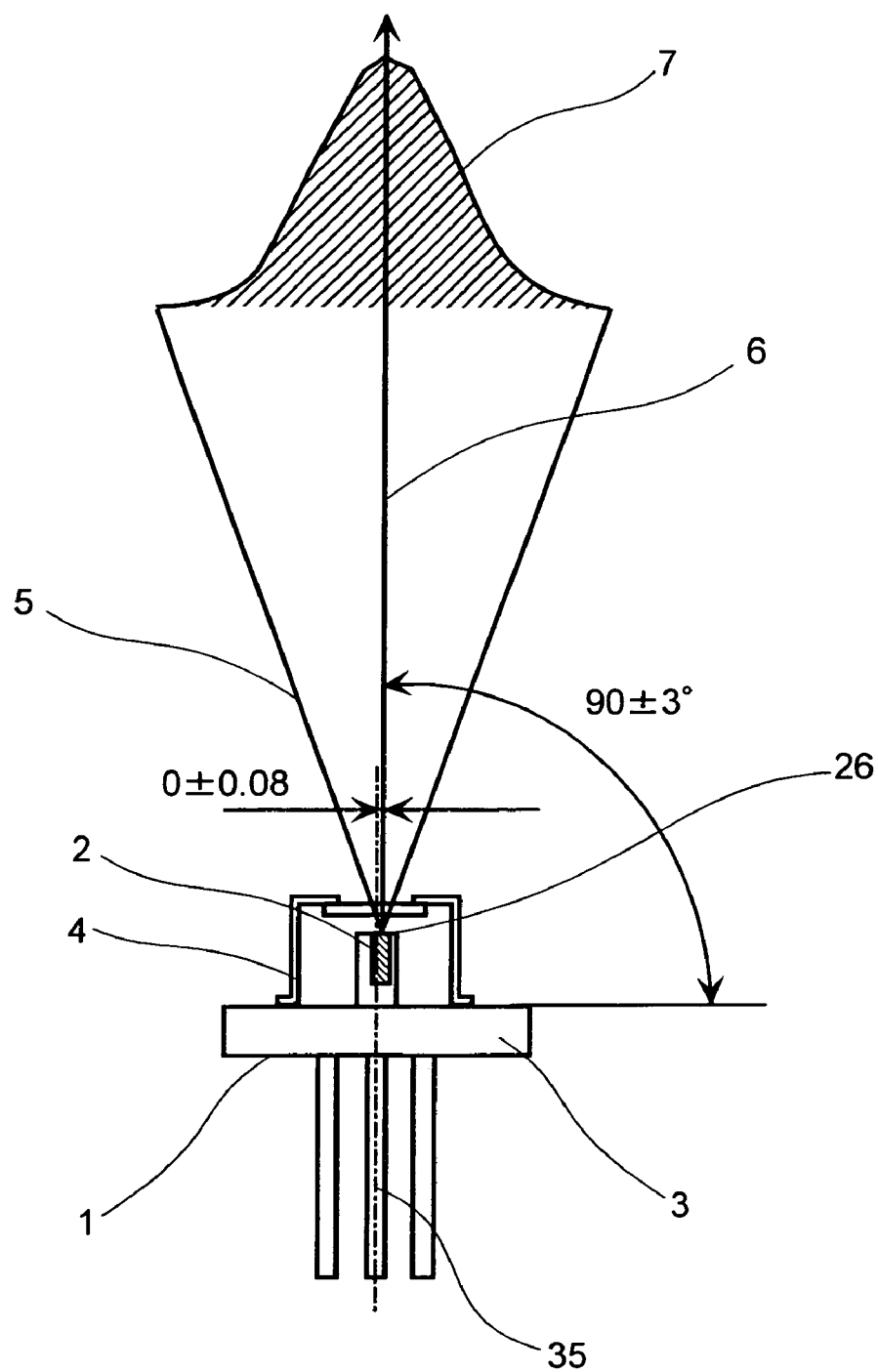
FIG. 4 shows a schematic view of a conventional semiconductor laser and the state of laser light.

FIG. 2 is a cross-sectional view of the semiconductor laser 1 and the holder 22. The base 3 of the semiconductor laser 1 is shaped like a circular plate and is pressed into the holder 22 having a cylindrical shape. The inner peripheral cylindrical surface and the outer peripheral cylindrical surface of the holder 22 are machined to be concentric, so that their centers are located at the substantially same point. Assume that the semiconductor laser 1 has variations b of ±0.08 mm in the position of the light emission point 26 and variations θ1 of ±3° in the direction of emission (center of intensity distribution) 6 in an arbitrary plane passing the reference optical axis of the semiconductor laser 1. Ignoring the errors of elements other than the semiconductor laser 1, the angle of inclination to be adjusted of the semiconductor laser 1 is estimated. In the case where the holder 22 is mounted on the fitting portion 23 of the case 8 of the optical head 38, to make the direction of emission 6 of the laser light of the semiconductor laser 1 described above pass the point of intersection 34 of the optical axis of the objective lens 13 described above and the principal plate on the semiconductor laser side of the collimating lens 10 described above, if the focal length of the collimating lens 10 is denoted as Lc and the angle of inclination to be adjusted of the semiconductor laser 1 is denoted as θ, the following equation is established, where the beam splitter 9 is ignored and the respective angles are considered to be small. The unit of angular measurement below is the radian.

$$b+h\times\theta+Lc\times(\theta-\theta 1)=0 \quad \text{(equation 1)}$$

From the above equation 1, θ=(Lc×θ1−b)/(h+Lc). The semiconductor laser 1 is previously inclined and adjusted with respect to the holder 22 by the use of a jig in the state where the outer peripheral portion of the base 3 is insert into the cylindrical holder 22.

A fitting portion 23 to receive the semiconductor laser 1 and the holder 22 is formed in the case 8 at the position where the optical axis 31 of the objective lens 13 is aligned with the center of the fitting portion. After inserting the holder 22 into the fitting portion 23, the holder is secured thereto using an adhesive 25 in the state where the end surface 24 of the holder 22 is pressed onto the mounting surface 16 formed on the case 8, so that the center, i.e., the center line 27, of the holder 22 is aligned to the optical axis 31 of the objective lens 13.

The position of the collimating lens 10 may be adjusted along the direction of its optical axis 30 and in the direction of a plane perpendicular to its optical axis 30, so that the optical axis 30 is parallel to the optical axis 31 of the objective lens 13. Accordingly, the collimating lens 10 is adjust to a position where the laser light 5 traveling through the collimating lens 10 passes as a luminous flux and is parallel to the optical axis 31 of the objective lens 13.

The case 8 is provided with a wall 36 to where the collimating lens is securely bonded. A gap of sufficient width is provided between the collimating lens and the wall 36 to allow the positional adjustment of the collimating lens 10. An ultraviolet curing adhesive 37 is inserted into the gap, the position of the lens 10 is adjusted, and then the adhesive is irradiated with ultraviolet rays to be cured, whereby the collimating lens 10 is fixed securely to the case 8 at that adjusted position. During the collimating lens 10 adjustment procedure, it is held by a jig, as will be explained in more detail below. Thus, the optical head 38 is not provided with a special structural member for adjusting the collimating lens 10.

Figure 12:
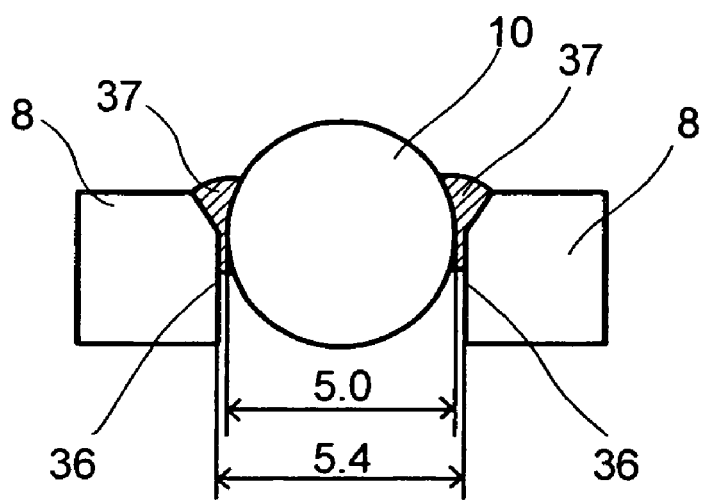
FIG. 12 shows a collimating lens and a support wall in an optical head according to one embodiment of the present invention, where the edges of the support wall are separated from the edges of the collimating lens by a given distance.

FIG. 12 shows a cross-sectional view of the collimating lens 10 bonded and fixed to the case 8 according to one embodiment of the present invention. The diameter of the collimating lens is 5 mm, and a width of the wall 36 is 5.4 mm. Accordingly, the gap is 0.2 mm on each side, which is greater than 0.185 mm, providing a sufficient space to adjust the position of the collimating lens 10. As shown in FIG. 12, all of the edges of the collimating lens that are parallel to the optical axis of the collimating lens are separated from (i.e., does not contact) the edges of the support wall.

In another embodiment, the gap is 0.3 mm, 0.25 mm, 0.22 mm, or 0.190 mm on each side. In yet another embodiment, the gap may be less than 0.185, e.g., 0.150 mm, with the increase of device precision. The wall 36 is tapered to facilitate application of the ultraviolet curing adhesive 37 into the gap. The ultraviolet curing adhesive 37 used in the present embodiment is selected from a plurality of different types having different coefficients of thermal expansion, hardness, elongation and so on. Preferably, the selected adhesive should be one that provides a minimal strain when used with the collimating lens 10 at high and low temperatures. In addition, the amount of the ultraviolet curing adhesive 37 inserted into the gap should be precisely controlled to cause minimal strain and shift of the lens 10.

Figure 13:
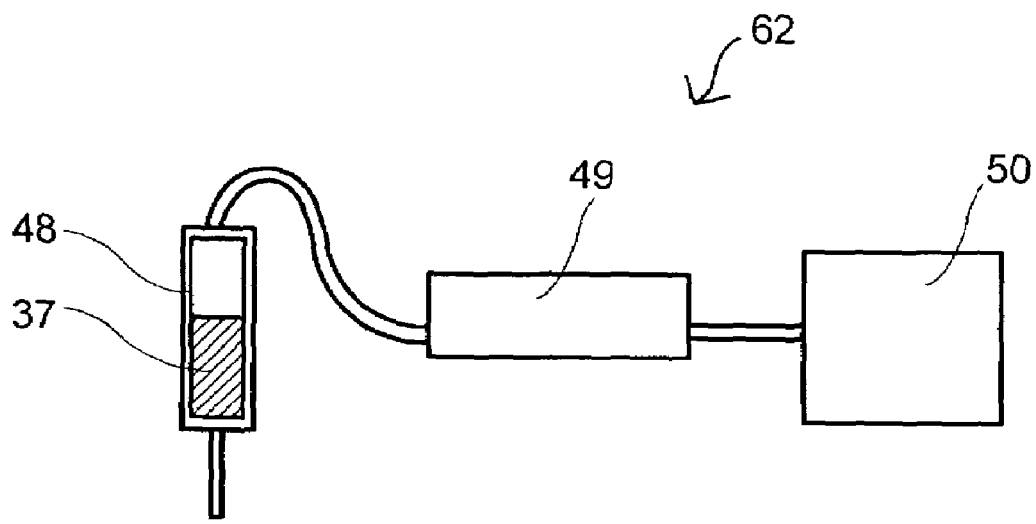
FIG. 13 shows a dispenser for providing an adhesive material into a gap between the collimating lens and the support according to one embodiment of the present invention.

FIG. 13 shows a dispenser 62 used for such a purpose according to one embodiment of the present invention. The dispenser 62 includes a syringe 48 containing the adhesive 37, a controller 49 that controls the syringe 48 to regulate the flow amount of the adhesive provided in the syringe 48, and an air supply 50 that supplies air to the controller 49. The controller 49 supplies the air to the syringe 48 and electronically controls the flow of the air supply to precisely regulate the amount of adhesive that is flowed out of an output port of the syringe 48 provided within the gap. In one embodiment, 2±0.4 mg of acrylic UV-curing adhesive is applied to the gap.

The semiconductor laser 1 described above has a plurality of variations. In the case where a size h in FIG. 2 is 2 mm, the maximum variation in the position of light emission point in a plane perpendicular to the direction of emission is 0.08+2×sin 3°=0.185 mm.

Therefore, when the position of the collimating lens 10 is adjusted in a plane perpendicular to the optical axis 30, it is necessary to ensure an amount of adjustment of the collimating lens 10 of 0.185 mm, so that the gap between the wall 36 and the collimating lens 10 needs to be not smaller than the amount of adjustment of 0.185 mm. The requisite minimum size of the gap depends on the size of h. Accordingly, the gap is at least 0.185 in this embodiment of the present invention.

Figure 5:
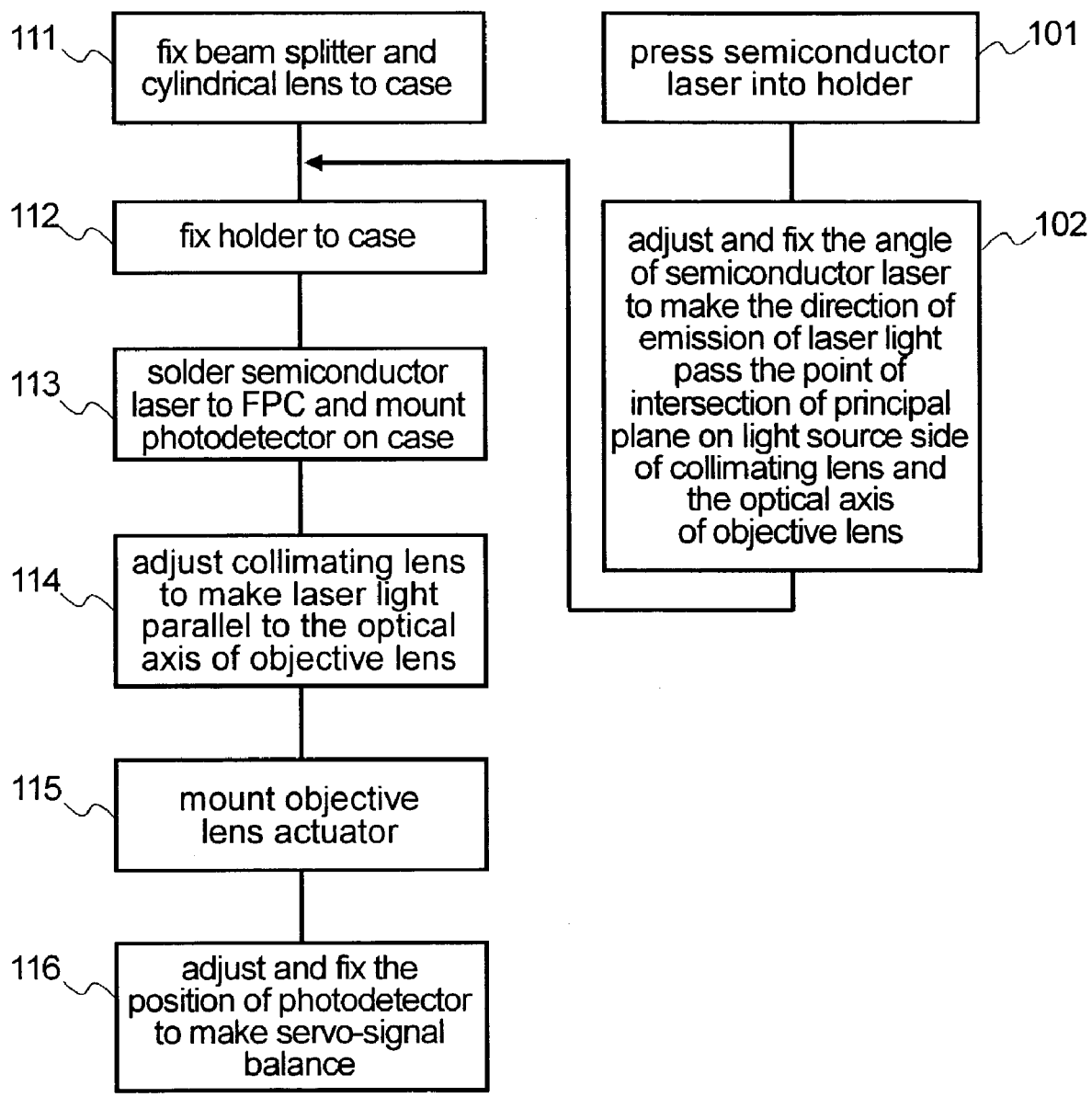
FIG. 5 shows a method of assembling the optical head of FIG. 1 according to one embodiment of the present invention.
Figure 6:
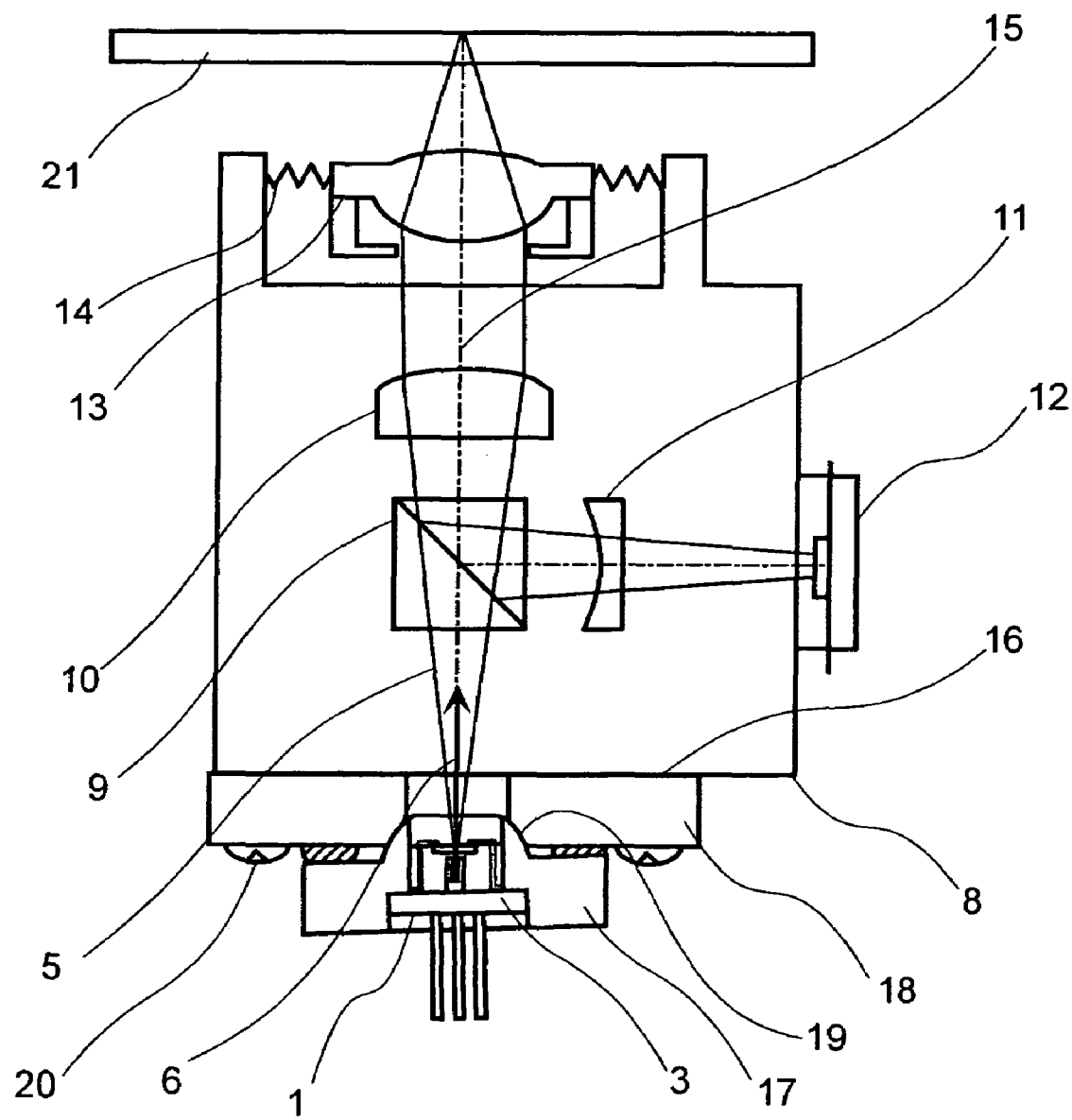
FIG. 6 shows a cross-sectional view of a conventional optical head.
Figure 7:
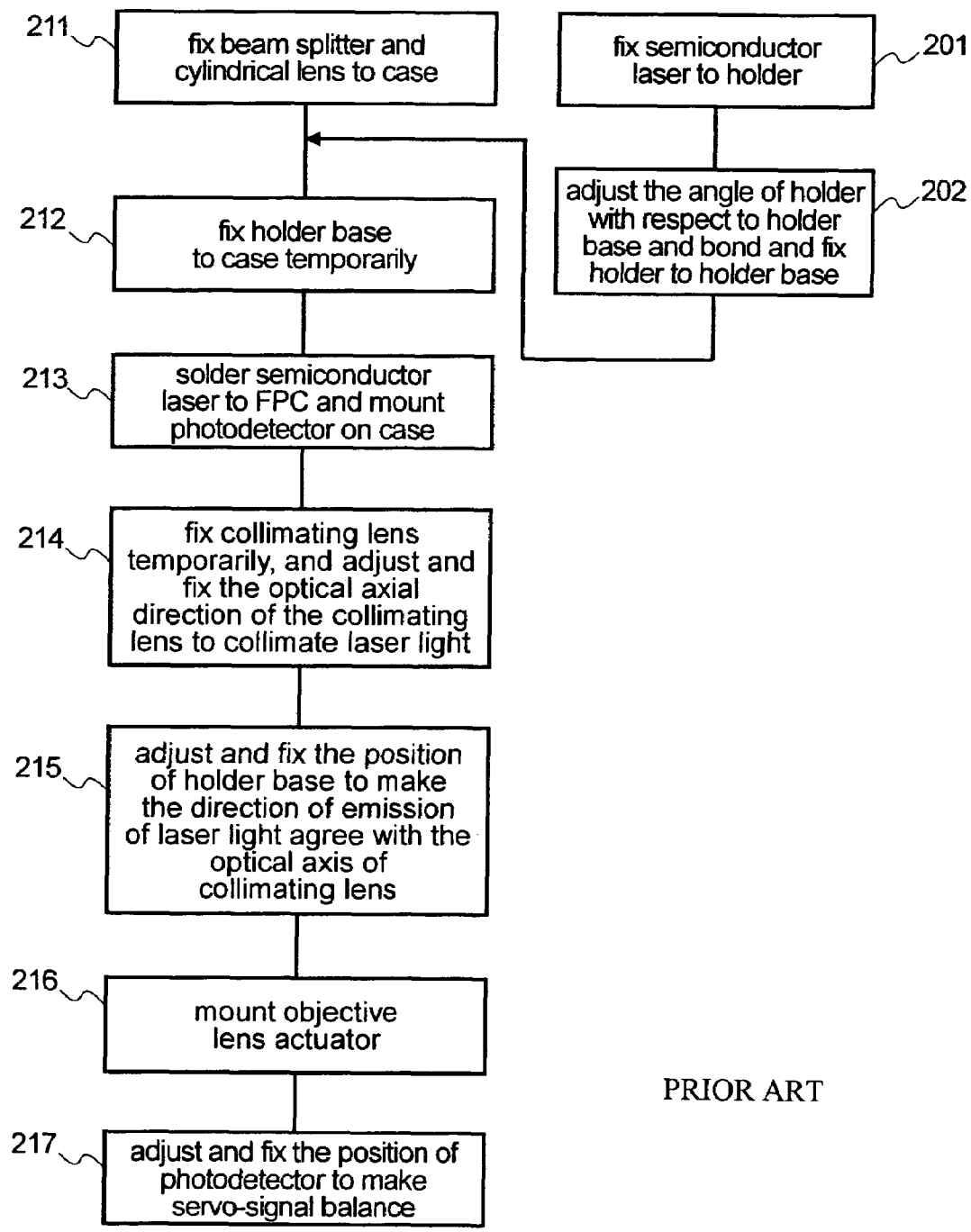
FIG. 7 shows a method of assembling an optical head.
Figure 9:
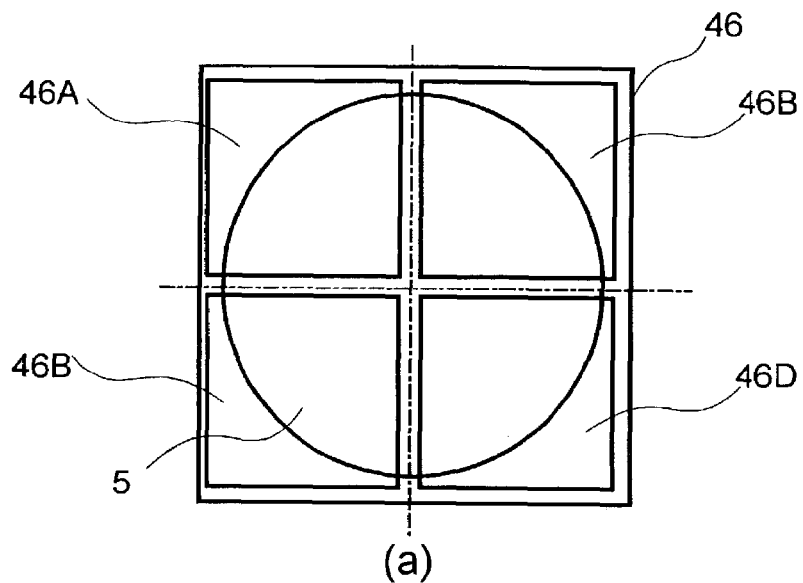
FIG. 9 illustrates the positions of a four-sectional sensor and the shape of the four-sectional sensor in adjusting the optical head of FIG. 1 according to one embodiment of the present invention.
Figure 9:
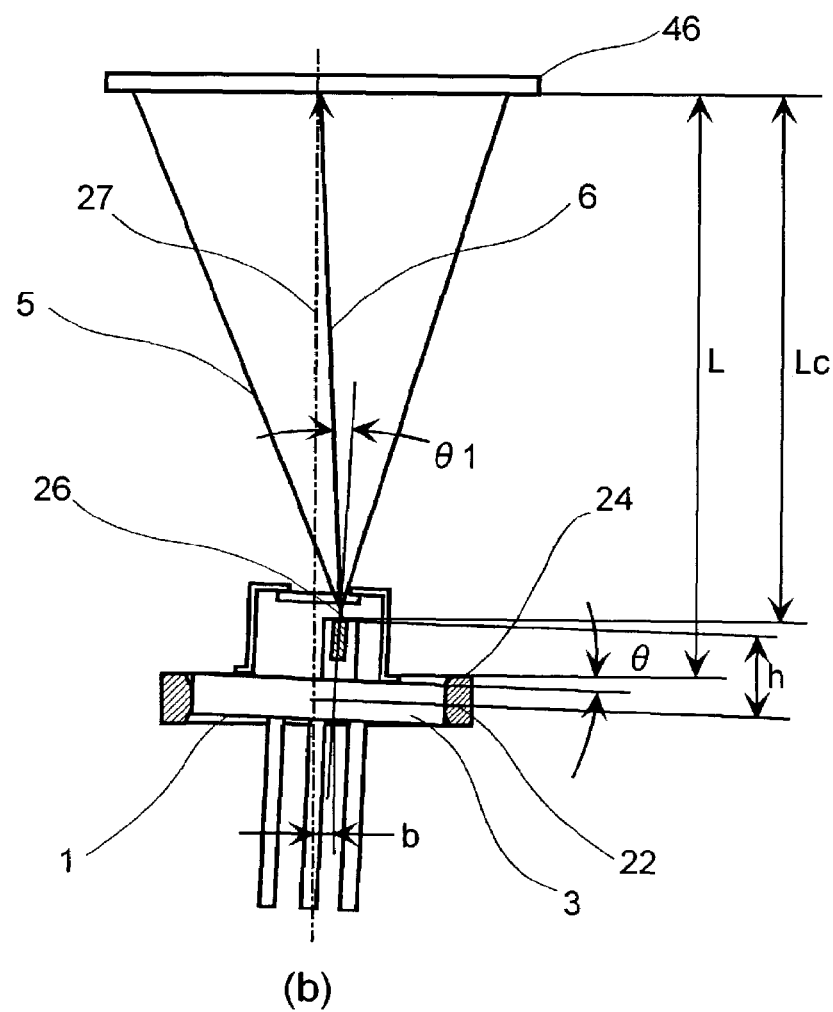
Figure 14:
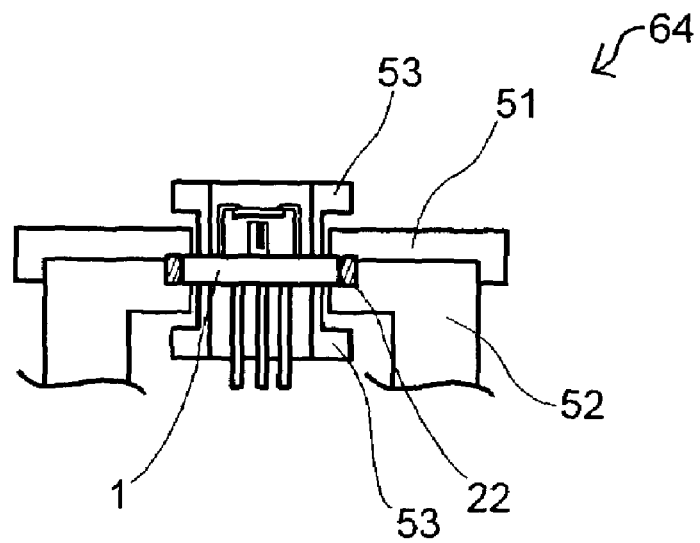
FIG. 14 shows a cross-sectional view of the jig with a semiconductor laser and a holder according to one embodiment of the present invention.

Referring to FIGS. 5, 9, and 14, an assembling process will be described with emphasis on an adjusting method. First, the semiconductor laser 1 is inserted into the holder 22 (step 101). Next, the holder 22 is mounted on a jig 64. FIG.14 shows a cross-sectional view of the jig with the semiconductor laser 1 and the holder 22. The jig 64 includes a first clamp 51 that secures the holder 22 to a body 52 of the jig and a second clamp 53 that grips the semiconductor laser 1. The first and second clamps are independently controllable.

A four-sectional photodiode sensor 46 having two dividing lines intersecting at right angles is disposed a distance L away from the end surface 24 of the holder 22 and at the position where the point of intersection of the dividing lines is aligned with the center 27 of the holder 22. Light is emitted from the semiconductor laser 1 to the photodiode sensor 46. The position of the semiconductor laser 1 is adjusted (i.e., the angle of incline of the semiconductor laser 1) with respect to the holder 22 using the second clamp 53 in order to balance the outputs of four elements 46A, 46b, 46C, 46D (FIG. 9(a)) of the photodiode sensor 46 (step 102).

Using the above procedure, the position of the semiconductor laser 1 is adjusted, so that the direction of emission (center of intensity distribution) 6 intersects the center 27 of the holder 22 (that is, the optical axis of the objective lens) at a distance L away (that is, at the position of a principal plane on the semiconductor laser side of the collimating lens 10). In one embodiment, the direction of emission (center of intensity distribution) 6 is detected through an image processing method using a CCD sensor instead of the four-sectional photodiode sensor. Although not necessary, the light-receiving surface of the photodiode sensor or the CCD sensor is preferably as large in size as the collimating lens 10.

For example, in the case where the focal length of the collimating lens 10 is 16 mm, the distance L is 17.3 mm. Therefore, the adjustment described above is made by using the jig 64 in which the photodiode is disposed at a position 17.3 mm away from the end surface 24 of the holder 22. The holder 22 including the semiconductor laser 1 that had its angle of incline adjusted is mounted on the case 8. Accordingly, it is not necessary to adjust subsequently the direction of emission (center of intensity distribution) 6 once the holder 22 is mounted on the case 8, which simplifies the optical head assembly procedure.

In the main part of the optical head 38, the beam splitter 9 and the cylindrical lens 11 are bonded and fixed to the case 8 (step 111). The case 8 has positioning references for them and they are bonded and fixed in accordance with these references. Next, the holder 22 adjusted according to the step 102 is inserted into the fitting portion 23 of the case 8 to put the end surface 24 of the holder 22 in close proximity with the mounting surface 16 and then securely bonded to the case 8 (step 112). Then, the terminal of the semiconductor laser 1 is inserted into the hole of an FPC (not shown) and is soldered to it. The photodetector 12 is soldered to the FPC (step 113). Next, the optical head 38 is mounted on a jig for adjusting the collimating lens 10 and the semiconductor laser 1 is made to emit light and the position of the collimating lens 10 is adjusted to make the laser light 5 passing through the collimating lens 10 parallel to the designed optical axis of the objective lens and then the collimating lens 10 is bonded and fixed there (step 114). At this time, the inclination of the collimating lens 10 itself can be adequately brought into an allowable range with the mechanical accuracy of the jig. The direction and the parallelism of the laser light 5 emitted from the collimating lens 10 to the optical axis of the objective lens are detected by the size and position of an image made by laser light received by a CCD camera disposed at a sufficient distance therefrom.

Next, an objective lens actuator (not shown) is mounted on the case 8 (step 115). The objective lens actuator is positioned with respect to the case 8 by a fitting portion or the like in such a way that the optical axis of the objective lens 13 is aligned with the center line 27 of the outside shape of the holder 22. Then, the optical head 38 is mounted on a servo signal adjusting jig to detect the output of the photodetector 12 caused by the laser light 5 that is emitted by the semiconductor laser 1, reflected by the optical disk 21 mounted on the jig, and entered into the photodetector 12. The position of the photodetector 12 is adjusted, so that a focus signal and a track error signal, which are produced by the output of the photodetector 12 described above, satisfy predetermined characteristics and then the photodetector 12 is bonded and fixed (step 116). The process described above is the assembling process of the optical head 38.

Figure 10:
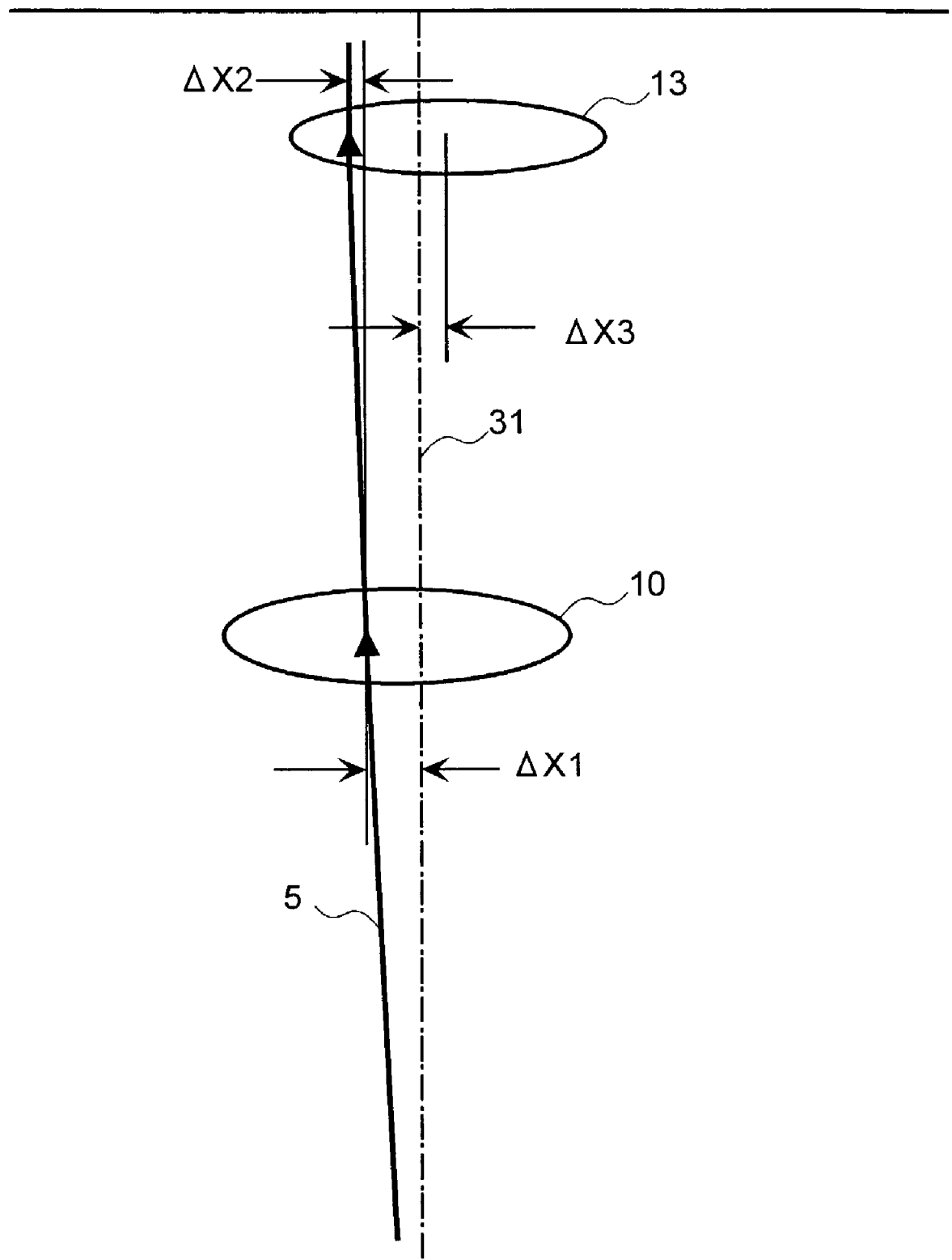
FIG. 10 illustrates an adjustment error in adjusting the optical head of FIG. 1 according to one embodiment of the present invention.
Figure 11:
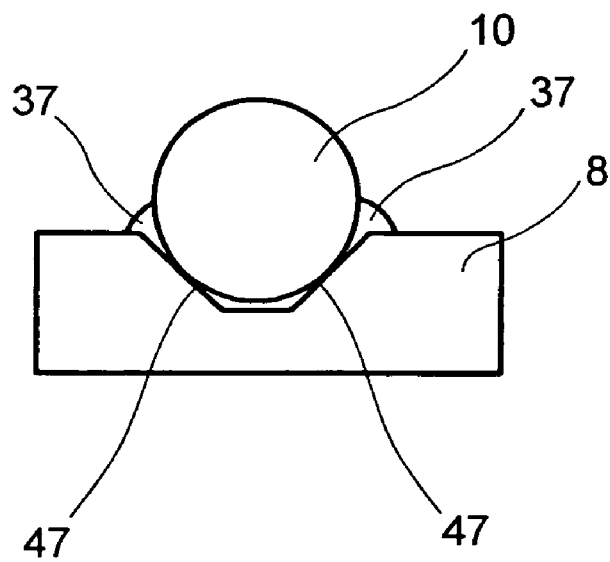
FIG. 11 shows a collimating lens and a support wall in a conventional optical head.

Here, the accuracy necessary for adjustment will be studied. The description will be made below with reference to FIG. 10. FIG. 10 is an illustration to show the optical relationship among the objective lens 13, the collimating lens 10 and the laser light 5 and an adjustment error. In the case where data like a DVD format is recorded on an optical disk, it is required that the center of intensity distribution of the laser light be positioned within a range of about 5% of the aperture of the objective lens. In a small-sized optical disk device, the aperture described above is about 3 mm, so that the allowable variations in the center of intensity distribution of the laser light entering the objective lens becomes about ±0.15 mm.

It is thought that the center of intensity distribution of the laser light entering the objective lens is deviated by the following four factors:

(1) position deviation of a detector used for adjustment in the step 102 and an adjustment error: $\Delta X1$;

(2) deviation caused by the inclination of the light emitted from the collimating lens with respect to the optical axis, which is caused by the adjustment error in the step 114; $\Delta X2$;

(3) position deviation of the objective lens when the actuator is mounted in the step 115: $\Delta X3$; and (4) angle deviation of a folding mirror (not shown): $\Delta X4$ where the errors $\Delta X1$, $\Delta X2$, and $\Delta X3$ are shown in FIG. 10. As to the deviation caused by the factor (2), it is said that, in recording or reproducing data on the disk, to bring the aberration of the objective lens into an allowable range, the allowable angle of the light entering the objective lens is about 0.3°. Hence, assuming that the angle of deviation of the light emitted from the collimating lens is no larger than 0.1° and that the distance between the collimating lens and the objective lens is 15 mm, the amount of deviation of the center of intensity distribution caused by the angle deviation described above at the position of the aperture of the objective lens is 15 mm×tan 0.1°=0.026 mm. The deviation caused by the factor (3), if an adjustment is not made, becomes about 0.1 mm and, if the adjustment is made, becomes about 0.02 mm. Because the distance from the folding mirror to the aperture of the objective lens is about 4 mm and the angle deviation of the light entering the objective lens caused by the folding mirror is about 0.20, so the deviation caused by factor (4) becomes about 4 mm×tan 0.2°=0.014 mm.

Taking into account the deviations described above, the adjustment error permitted for the factor (1) is believed to be as follows. First, in consideration of the randomness of the respective errors, the following conditions are examined, where the root mean square of the deviation caused by the respective factors becomes no larger than the allowable variations of the center of intensity distribution of ±0.15 mm. If the position adjustment of the actuator described in the factor (3) is not made, then $\sqrt{(0.15^2 - 0.026^2 0.1^2 - 0.014^2)} = 0.1$, and thus the allowable deviation of the factor (1) is 0.11 mm. On the other hand, if the position adjustment of the actuator is made, then $\sqrt{(0.15^2 - 0.026^2 - 0.2^2 - 0.014^2)} = 0.146$, and thus the allowable deviation of the factor (1) is 0.146 mm.

Next, calculating the allowable deviation in the case where the worst conditions overlap, if the position of the actuator is not adjusted in the factor (3), then 0.150−0.026−0.1−0.014=0.01 mm, and thus the allowable deviation of the factor (1) is 0.01 mm, whereas if the position of the actuator is adjusted, then 0.15−0.026−0.02−0.014=0.09 mm and thus the allowable deviation of the factor (1) is 0.09 mm.

Actually, it is thought that the root mean square method can be applied, so that if the actuator is adjusted, the factor (1), that is, the position deviation and the adjustment error of the detector used in adjusting the step 102 can be allowed to an extent of 0.146 mm. In contrast, if the factor (1) can be made smaller than 0.05 mm, then $\sqrt{(0.15^2 - 0.05^2 - 0.026^2 - 0.014^2)} = 0.138$, so that it is possible to allow the position deviation of the objective lens when the actuator is mounted in the factor (3) to an extent of 0.138 mm.

The errors in the factor (1) described above are mainly produced by the position deviation of the detector for adjustment and the deviation caused by an adjustment work or the adjustment error of an adjustor. The magnitude of these deviations and errors depend on the adjustment apparatus and the design of the optical head. Accordingly, it is possible to make the position deviation of the detector about 0.03 mm and adjustment deviation be no larger than 0.05 mm, so that this can be realized in consideration of the root mean square method. In this respect, assuming that the focal length of the collimating lens is 16 mm, in the case where the allowable deviation of the factor (1) is 0.11 mm, the allowable deviation in the direction of the laser light 5 can be approximated by the following equation: tan (0.11/16) ≅0.0069 radian, that is, becomes 0.4°.

Up to this point has been described the case of a DVD format optical disk device capable of recording, and in an optical device designed specifically for reproducing, the allowable amount of deviation of the center of intensity distribution of the laser light entering the objective lens is large, so that there is the possibility of omitting a part of adjustment described above. In an optical disk device having a higher density than the DVD, which is expected to be a commercially available in the future, even the optical disk device designed specifically for reproducing can reduce the allowable deviation of the optical system, so that the application of the present invention to such an optical device is expected to produce an effect not only in an optical disk device only for recording but also in an optical disk device for reproducing.

According to the procedure described above, the collimating lens 10 is adjusted at the position where the optical axis 30 is aligned with the laser light emission point 26, and thus the laser light 5 passing through the collimating lens 10 passes as a luminous flux parallel to the optical axis 31 of the objective lens 13 and a part of the luminous flux is interrupted by the aperture 32 and is entered into the objective lens 13 as a luminous flux that is circular in cross section and has its center at the optical axis 31 of the objective lens 13.

The semiconductor laser 1 is fixed to the holder in the state where the direction of emission (center of intensity distribution) 6 is previously adjusted to pass the point of intersection 34 of the optical axis 31 of the objective lens 13 and the principal plane 33 on the laser light source side of the collimating lens 10, so that the laser light in the direction of emission (center of intensity distribution) 6 passes the point of intersection 34 and then passes on the optical axis 31 and enters the objective lens 13.

The laser light 5 (shown by a dotted line) reflected by the optical disk 21 and passed through the aperture 32 reaches the photodetector 12 and the direction of emission (center of intensity distribution) 6 is aligned with the center of the luminous flux to keep the luminous flux in balance, so that it is hard to raise a problem of producing an offset in the output of the photodetector 12.

FIG. 3(a) is a plan view to show the shape of the holder 22, and FIG. 3(b) is the cross-sectional view of the holder 22. The holder 22 is shaped like a cylinder and its vertical distance (i.e., height) d is larger than the thickness of the base 3. Thus, this produces the effect that even if the base 3 of the semiconductor laser 1 is inclined with respect to the holder 22, the base 3 does not protrude from the holder 22, in other words, a protrusion does not interfere with mounting end surface 24 of the holder 22 on mounting surface 16 of the case of the optical head. In addition, a portion 28 in contact with the base 3 has a width of e that is smaller than the thickness of the base 3 and is formed to have a convex shape. Thus, this can produce the effect that even if the base 3 is inclined in the state where the base 3 is pressed into the holder 22, the inclined state of the base 3 can be stably kept.

The center of the convex portion 28 in press contact with the base 3 lies on a plane because of the contact of cylindrical surfaces. The base 3 is inclined with center on the center plane 29 of the convex portion 28. Both sides of the width e of the holder 22 are tapered to make the base 3 easily press into the holder 22. In addition, as the thickness t of the holder 22 becomes smaller, the force required for pressing the base 3 into the holder 22 and inclining the base 3 becomes smaller, which makes the work easy. As one example of dimensions, if the thickness of the base 3 is 1.2 mm, then d=1.5 mm, e=0.5 mm, t=0.6 mm. As to the material of the holder 22, the holder 22 is preferably made of metal from the viewpoint of the heat radiation of the semiconductor laser 1, for example, brass, copper, aluminum, stainless steel or the like, and is manufactured by machining by the use of a lathe with high accuracy and at low cost. The holder 22 is also made by pressing.

While the holder 22 is fixed to the case 8 with the adhesive 25 in the embodiment described above, the outer peripheral portion of the holder 22 may be pressed into and fixed to the fitting portion 23 and may be fixed with a spring or a screw. To efficiently conduct the heat generated by the semiconductor laser 1 to the case 8 to cool the semiconductor laser 1, it is desirable that the contact surface of the base 3 and the holder 22 and the contact surface of the holder 22 and the mounting surface 16 and the fitting portion 23 be made larger. In particular, as to the width e of the press-contact surface of the holder 22, the above-described value was selected to realize both the easy inclining of the base 3 and the thermal resistance described above.

According to the embodiment described above, the direction of emission (center of intensity distribution) 6 of the semiconductor laser 1 can be adjusted and positioned with one component of the holder 22, so that it is possible to reduce the size of the optical head and to expect an improvement in reliability. In addition, by mounting the optical head using the embodiment described above on an optical disk device, the optical disk device can be reduced in size and is expected to improve its reliability.

Figure 8:
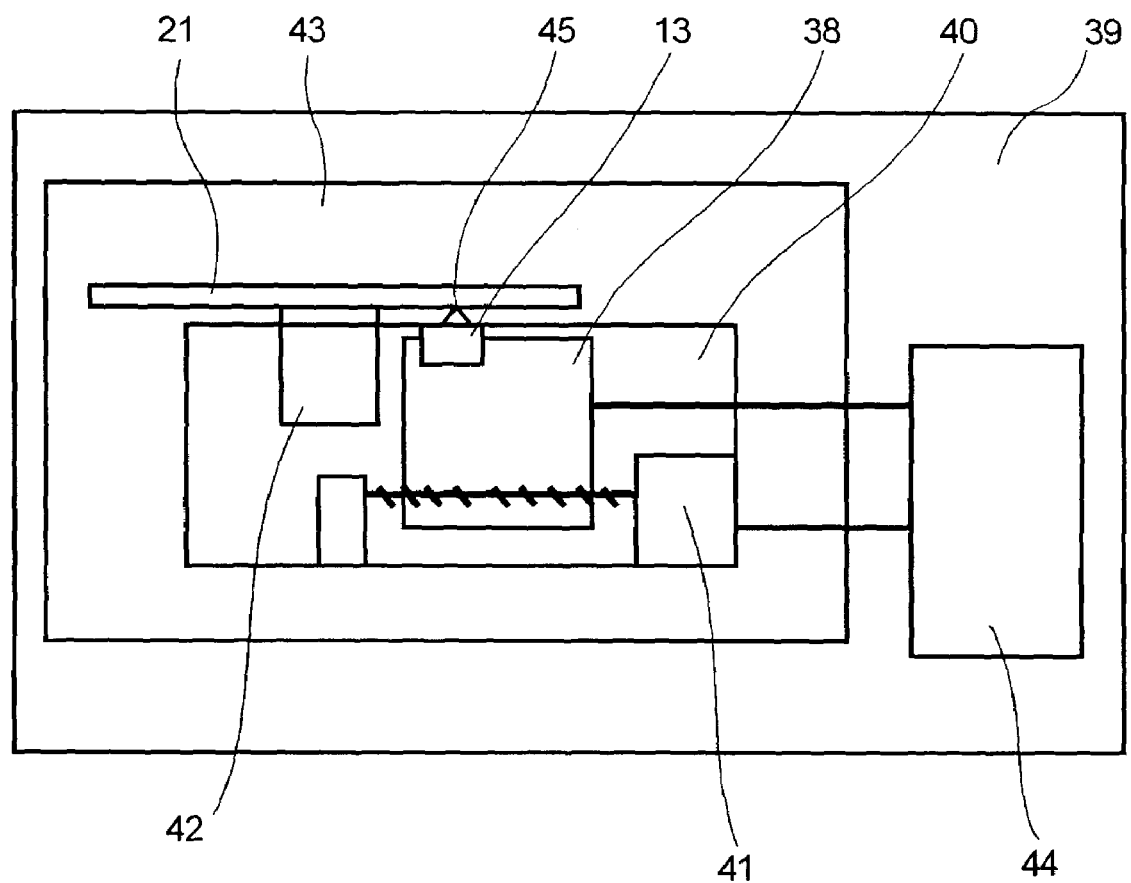
FIG. 8 illustrates an optical disk device using the optical head of FIG. 1 according to one embodiment of the present invention.

An optical disk device 39 using the optical head 38 will be hereinafter described with reference to FIG. 8. The optical head 38 assembled in the manner described above is mounted on the sliding mechanism 41 of the unit mechanism 40. The unit mechanism 40 includes a spindle motor 42 and the sliding mechanism 41. The spindle motor 42 rotates the optical disk 21 and the sliding mechanism 41 moves the optical lens 13 in the radial direction of the optical disk 21 described above with the optical lens 13 opposed to the optical disk 21 described above. The unit mechanism 40 described above is mounted on a loading mechanism 43 having a mechanism that mounts or dismounts the optical disk 21 described above on or from the spindle motor 42. The optical head 38, the spindle motor 42, the sliding mechanism 41, and the actuator and the motor of the loading mechanism 43 are driven by a control circuit 44. The loading mechanism 43 and the spindle motor 42 are controlled in accordance with a sequence started when an operator turns on a switch. In accordance with the predetermined sequence, the control circuit drives the actuator (not shown) provided on the optical head 38 to perform a focus control in such a way that the laser light 5 emitted from the semiconductor laser 1, not shown in FIG. 8, forms a small spot of light 45 on the recording surface of the optical disk 21.

Further, the control circuit 44 performs a track control in such a way that the small spot of light 45 described above tracks an information track formed on the recording surface described above. The focus signal and the track error signal, which have been described in the description of the assembling, are used as information for the focus control and the track control. In addition, in the case of an optical disk device in which a read circuit can read and record information from a change in the output of the optical detector 12, the information is recorded by changing the light intensity of the semiconductor laser 1 and transforming the optical characteristics of the recording surface of the optical disk 21. The sliding mechanism 41 moves the optical head 38 by a command from the control circuit 44 and enables the optical head 38 to get access to data at a desired position on the optical disk 21. The optical disk device 39 having such a function can be used as a recording and reproducing device for a personal computer and a recording and reproducing device for a video camera.

The optical head of the present embodiment may be used in an optical disk device for a portable notebook personal computer or an optical disk device for a portable disk camera or camcorder because the present embodiment facilitates size reduction of the optical disk device. The present optical head also may be used in those optical devices that are concerned with size reduction issues because the optical head of the present embodiment facilitates adjustment of the semiconductor laser and the components around the collimating lens. The present optical head may be implemented in such devices without use of any special technology.

While the optical head used for the optical disk device has been described above, the effective field of the present invention is not necessarily limited to the optical disk but can be effective also for a position sensor using the semiconductor laser.

It should be noted that the terms such as "perpendicular" or "parallel" refers to a relationship that provide substantially 90 or 180 degree angles since it is difficult obtain angular relationship of exactly 90 or 180 degree in the real world.

As described above, the present invention has the structure in which the holder 22 of the laser light source described above which is previously adjusted in such a way that the direction of emission (center of intensity distribution) of the laser light source 1 satisfies the optically desirable conditions is fitted in the fitting portion of the case 8 to position the laser light. Therefore, the present invention can reduce the size of the optical head and improve its reliability and further can manufacture the holder at low cost.

The above detailed descriptions are provided to illustrate specific embodiments of the present invention and are not intended to be limiting. Numerous modifications and variations within the scope of the present invention are possible. Accordingly, the present invention is defined by the appended claims.

What is claimed is:

1. An optical disk apparatus, comprising:
   a motor to rotate an optical disk; and
   an optical head to apply light to the optical disk, the optical head including:
      a light source to emit the light to be applied to the optical disk,
      a collimating lens to receive and collimate the light emitted by the light source,
      a support wall to support the collimating lens at a particular position, the support wall being configured to provide a gap between the collimating lens and the support wall to enable the collimating lens to be adjusted from an initial position to the particular position, the adjustment involving at least a movement in a direction that is perpendicular to the optical axis of the collimating lens, and
      an objective lens being configured to receive the light from the collimating lens in order to apply the light to the optical disk,
   wherein a center of intensity distribution of the light source passes a point of intersection of an optical axis of the objective lens and a principal surface on the light source side of the collimating lens, and an axis of the center of intensity distribution of the light source is not parallel to an optical axis of the collimating lens or the objective lens,
   wherein the light source includes a circular base, wherein the optical head further includes:
   a case to support the collimating lens, the objective lens, and the support wall; and
   a holder having a unitary structure to hold the light source at a given position, the holder being secured to the case, so that the central axis of the circular base is aligned with an optical axis of the objective lens,
   wherein the holder includes an inner portion to receive the light source and an outer portion to be secured to the case, the inner portion being convex shaped, the inner portion and the outer portion having a common central axis.

2. An optical head, comprising:
   a light source assembly including:
   a semiconductor laser configured to emit light to be applied to the optical disk, and
   a holder having a unitary structure to hold the laser light source, at a fixed position the holder having a convex inner portion to receive and securely hold the semiconductor laser;
   a collimating lens to receive and collimate the light emitted by the light source, the collimating lens having an optical axis;
   a support assembly to support the collimating lens at a particular position, the support assembly being configured to provide a gap between an edge of the collimating lens and an edge of the support assembly, so that the collimating lens may be adjusted from an initial position to the particular position;
   an adhesive provided in at least a portion of the gap between the support assembly and the collimating lens, the adhesive being hardened to securely hold the collimating lens at the particular position; and
   an objective lens being configured to receive the light from the collimating lens and apply the light to the optical disk,
   wherein the light source assembly is configured to emit the light in a direction that is not parallel to an optical axis of the objective lens or the collimating lens, and to emit the light in a direction which of an axis of a center of intensity distribution passing an intersection point of an optical axis of the objective lens and a principal surface on the light source side of the collimating lens.

3. The optical head of claim 2, the semiconductor laser has a base, wherein the contact width between the base and the holder is smaller than the thickness of the base.

4. The optical head of claim 2, the semiconductor laser has a base, wherein the thickness of the holder is wider than the thickness of the base.

* * * * *